(12) United States Patent
Jung

(10) Patent No.: US 9,184,634 B2
(45) Date of Patent: Nov. 10, 2015

(54) WIRELESS POWER TRANSMITTER AND WIRELESS POWER TRANSMISSION METHOD

(75) Inventor: Woo Kil Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/241,146

(22) PCT Filed: Jul. 10, 2012

(86) PCT No.: PCT/KR2012/005448
§ 371 (c)(1),
(2), (4) Date: Apr. 21, 2014

(87) PCT Pub. No.: WO2013/032129
PCT Pub. Date: Mar. 7, 2013

(65) Prior Publication Data
US 2014/0265622 A1    Sep. 18, 2014

(30) Foreign Application Priority Data

Aug. 26, 2011    (KR) ................ 10-2011-0085644

(51) Int. Cl.
| | |
|---|---|
| H01F 27/42 | (2006.01) |
| H01F 37/00 | (2006.01) |
| H01F 38/00 | (2006.01) |
| H02J 17/00 | (2006.01) |
| H02J 7/02 | (2006.01) |

(Continued)

(52) U.S. Cl.
CPC . *H02J 17/00* (2013.01); *H02J 5/00* (2013.01); *H02J 5/005* (2013.01); *H02J 7/025* (2013.01); *H04B 5/0037* (2013.01)

(58) Field of Classification Search
CPC .............. H02J 7/025; H02J 17/00; H02J 5/00
USPC ....................................................... 307/104
See application file for complete search history.

(56) References Cited

U.S. PATENT DOCUMENTS

2007/0182367 A1 *   8/2007  Partovi .................... 320/108
2009/0302800 A1    12/2009  Shiozaki et al.

(Continued)

FOREIGN PATENT DOCUMENTS

| JP | 2010-239848 A | 10/2010 |
| KR | 10-2005-0105200 A | 11/2005 |

(Continued)

OTHER PUBLICATIONS

International Search Report in International Application No. PCT/KR2012/005448, filed Jul. 10, 2012.

*Primary Examiner* — Carlos Amaya
(74) *Attorney, Agent, or Firm* — Birch, Stewart, Kolasch & Birch, LLP

(57) ABSTRACT

Disclosed are a wireless power transmitter and a wireless power transmission method thereof. The wireless power transmitter, which wirelessly transmits power to a wireless power receiver, includes a power source to generate AC power, a transmission coil receiving power from the power source to generate a magnetic field, a transmission resonance coil coupled with the transmission coil to transmit power generated by the magnetic field to the wireless power receiver using resonance, and a detector detecting an existence state of the wireless power receiver by detecting power transmitted through the transmission resonance coil.

10 Claims, 2 Drawing Sheets

(51) Int. Cl.
*H02J 5/00* (2006.01)
*H04B 5/00* (2006.01)

(56) References Cited

U.S. PATENT DOCUMENTS

2010/0181961 A1 7/2010 Novak et al.

2012/0062173 A1* 3/2012 Choi et al. .................... 320/108

FOREIGN PATENT DOCUMENTS

KR 10-2010-0012944 A 2/2010
WO WO-00-54387 A1 9/2000

* cited by examiner (a)   (b)

WIRELESS POWER TRANSMITTER AND WIRELESS POWER TRANSMISSION METHOD

CROSS-REFERENCE TO RELATED APPLICATIONS

This application is the U.S. national stage application of International Patent Application No. PCT/KR2012/005448, filed Jul. 10, 2012, which claims priority to Korean Application No. 10-2011-0085644, filed Aug. 26, 2011, the disclosures of each of which are incorporated herein by reference in their entirety.

TECHNICAL FIELD

The disclosure relates to a wireless power transmitter and a wireless power transmission method thereof. In more particular, the disclosure relates to a wireless power transmitter capable of effectively transmitting power by actively controlling the power according to the recognition of a wireless power receiver, and a wireless power transmission method thereof.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

The wireless power transmission system includes a transmitter and a receiver. The transmitter wirelessly transmits power to the receiver, and the receiver receives the power from the transmitter and performs the operation according to the reception of the power.

In this case, since the transmitter cannot recognize the operating state of the receiver, the transmitter continuously transmits power to the receiver so that the receiver can normally operate always.

However, the transmitter always transmits the power to the receiver regardless of the operating state of the receiver as described above, so that high voltage is applied to the coil of the transmitter. Accordingly, when power is transmitted to the receiver thereafter, the erroneous operation or the breakage of the transmitter may occur. In addition, since the transmitter transmits the predetermined quantity of power to the receiver regardless of the quantity of power required by the load of the receiver, remaining power except for the power used in the load of the receiver may be wasted.

SUMMARY OF THE INVENTION

According to the embodiment of the disclosure, the existence state of a receiver around a transmitter is determined, and power can be selectively transmitted to the receiver according to the detection result.

In addition, according to the embodiment of the disclosure, the quantity of power required by the receiver is recognized, so that only the quantity of power necessary for the receiver can be selectively transmitted.

Further, according to another embodiment of the disclosure, if the receiver is not located in a place in which power can be transmitted, high voltage can be prevented from being applied to the coil of the transmitter, so that the erroneous operation or the breakage of the transmitter can be prevented.

According to the embodiment of the disclosure, there is provided a wireless power transmitter to wirelessly transmit power to a wireless power receiver. The wireless power transmitter includes a power source to generate AC power, a transmission coil receiving power from the power source to generate a magnetic field, a transmission resonance coil coupled with the transmission coil to transmit power to the wireless power receiver using resonance, and a detector detecting an existence state of the wireless power receiver by detecting power transmitted through the transmission resonance coil.

According to the embodiment of the disclosure, there is provided a wireless power transmission method by a wireless power transmitter to wirelessly transmit power to a wireless power receiver. The wireless power transmission method includes generating AC power, wirelessly transmitting power supplied from a power source to the wireless power receiver, detecting the transmitted power, and detecting an existence state of the wireless power receiver by detecting the transmitted power.

As described above, according to the embodiment of the disclosure, the output of the power is determined according to the existence state of a receiver, and the intensity of the power is adjusted according to the approach state of the receiver, so that the loss of power to be meaningless wasted can be minimized.

DETAILED DESCRIPTION OF THE EMBODIMENTS

Figure 1:
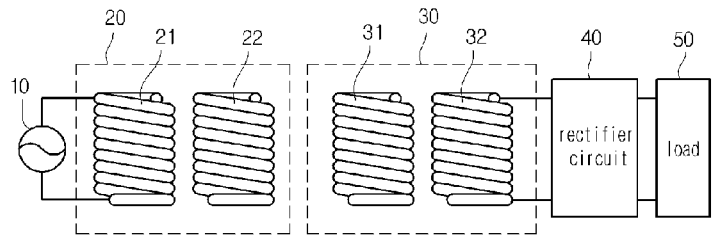
FIG. 1 is a view showing a wireless power transmission system according to one embodiment of the disclosure.

Hereinafter, an exemplary embodiment of the disclosure will be described in more detail with reference to accompanying drawings. In the following description, the same elements will be assigned with the same reference numerals for the purpose of obvious comprehension of the disclosure, and the repeated description of the same element will be omitted in order to avoid redundancy.

FIG. 1 is a view showing a wireless power transmission system according to one embodiment of the disclosure;

Referring to FIG. 1, the wireless power transmission system may include a power source 10, a transmitter 20, a receiver 30, a rectifier circuit 40, and a load 50.

Hereinafter, the operation of the wireless power transmission system having the above structure will be described. The power generated from the power source 10 is transmitted to the transmitter 20 and then transmitted to the receiver 30 that makes resonance with the transmitter 20, that is, has a resonant frequency value equal to that of the transmitter 20 using resonance.

The power transmitted to the receiver 30 is transmitted to the load 50 through the rectifier circuit 40. The load 50 may be a battery or other devices requiring the power.

In more detail, the power source 10 is an AC power source to provide AC power having a predetermined frequency.

The transmitter 20 includes a transmission coil 21 and a transmission resonance coil 22.

The transmission coil 21 is connected to the power source 10 and AC current flows through the transmission coil 21. As the AC current flows through the transmission coil 21, the AC current is induced to the transmission resonance coil 22, which is physically spaced apart from the transmission coil 21, through the electromagnetic induction.

The power transmitted to the transmission resonance coil 22 is transmitted to the receiver 30 which forms a resonant circuit together with the transmitter 20 by resonance.

According to the power transmission using resonance, the power can be transmitted between two LC circuits which are impedance-matched. The power transmission scheme using the resonance can transmit the power farther than the power transmission scheme using the electromagnetic induction with the higher power transmission efficiency.

The receiver 30 includes a reception resonance coil 31 and a reception coil 32.

The power transmitted through the transmission resonance coil 22 is received in the reception resonance coil 31 so that the AC current flows through the reception resonance coil 31.

The power transmitted to the reception resonance coil 31 is transmitted to the reception coil 32 through the electromagnetic induction. The power transmitted to the reception coil 32 is rectified through the rectifier circuit 40 and then transmitted to the load 50.

In this case, according to the type of the electronic device to receive power, the receiver may include the rectifier circuit 40, which is provided at the rear end of the reception coil 32 and includes a rectifier diode and a smoothing capacitor to smooth a rectified signal, if the supply of the DC power is required, or may have the structure without the rectifier circuit 40 including the diode and the smoothing capacitor in the case of parts requiring the supply of power having an AC waveform.

In addition, the transmission resonance coil 22 and the reception resonance coil 31 are elements to increase the transmission efficiency of the wireless power. Accordingly, only one of the transmission resonance coil 22 and the reception resonance coil 31 may be used or none of the transmission resonance coil 22 and the reception resonance coil 31 may be used.

The transmission resonance coil 22 of the transmitter can transmit power to the reception resonance coil 31 of the receiver 30 through a magnetic field. In more detail, the transmission resonance coil 22 and the reception resonance coil 31 are resonance-coupled with each other so that the transmission resonance coil 22 and the reception resonance coil 31 operate at the resonance frequency.

The power transmission efficiency between the transmitter 20 and the receiver 30 can be greatly improved due to the resonance-coupling between the transmission resonance coil 22 and the reception resonance coil 31.

Figure 2:
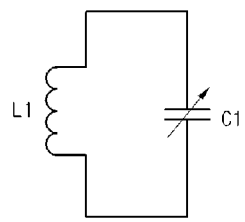
FIG. 2 is a circuit diagram showing a transmission coil according to one embodiment of the disclosure.

FIG. 2 is a circuit diagram showing the transmission coil 21 according to one embodiment of the disclosure.

As shown in FIG. 2, the transmission coil 21 may include an inductor L1 and a capacitor C1 and a circuit having predetermined inductance and capacitance values can be formed by using the inductor L1 and the capacitor C1.

The capacitor C1 may include a variable capacitor, and impedance matching may be performed by adjusting the variable capacitor. In this case, the variable capacitor may be series-connected. In addition, the variable capacitor may be parallel-connected. The equivalent circuit of the transmission resonance coil 22, the reception resonant coil 31 and the reception coil 32 may the same as the equivalent circuit shown in FIG. 2.

Figure 3:
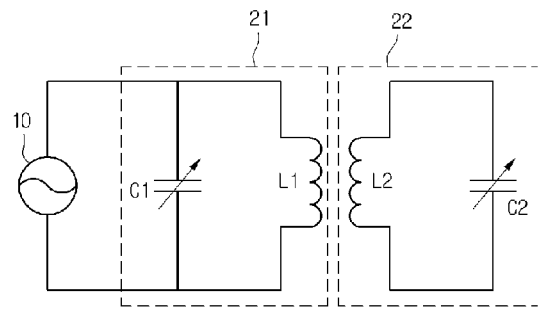
FIG. 3 is a circuit diagram showing an equivalent circuit of a power source and a transmitter according to one embodiment of the disclosure.

FIG. 3 is a view showing an equivalent circuit of the power source 10 and the transmitter 20 according to one embodiment of the disclosure.

As shown in FIG. 3, the transmission coil 21 and the transmission resonance coil 22 may be constructed by using inductors L1 and L2 having predetermined inductance values and capacitors C1 and C2 having predetermined capacitance values.

Figure 4:
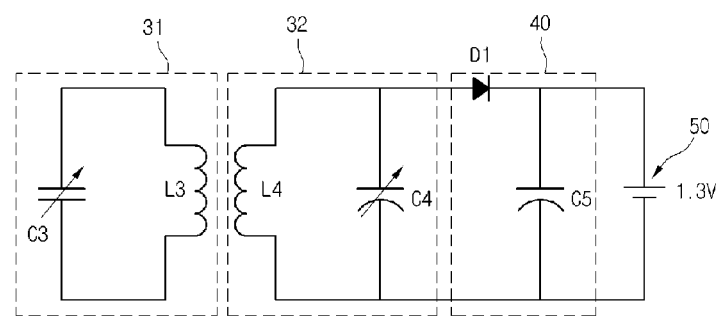
FIG. 4 is a circuit diagram showing an equivalent circuit of a reception resonance coil, a reception coil, a rectifier circuit, and a load according to one embodiment of the disclosure.

FIG. 4 is a view showing an equivalent circuit of the reception resonance coil 31, the reception coil 32, the rectifier circuit 40, and the load 50 according to one embodiment of the disclosure.

Referring to FIG. 4, the reception resonance coil 32 and the reception coil 31 may be constructed by using inductors L3 and L4 having preset inductance values and capacitors C3 and C4 having preset capacitance values.

The rectifier circuit 40 may include a diode D1 and a smoothing capacitor C5 to convert AC power into DC power to be output.

Although the load 50 is marked as a DC voltage source of 1.3V, the load 50 may include a predetermined rechargeable battery or a device requiring DC power.

Figure 5:
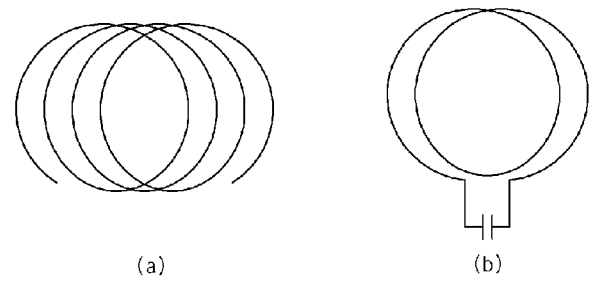
FIGS. 5(a) and 5(b) are views showing coils according to the embodiment of the disclosure.

A solenoid-type self inductance L and a parasitic capacitance C shown in FIGS. 5(a) and 5(b) can be expressed following Equations 1 and 2.

$$L = 3.94 \times 10^{-5} \frac{r^2 N^2}{(9r + 10l)} [\mu H] \quad \text{[equation 1]}$$

$$C = \frac{4\varepsilon_0 l}{\pi}\left(1 + 0.8249\frac{D}{l} + 2.329\sqrt[3]{\frac{D}{l}}\right) [\text{Farads}] \quad \text{[equation 2]}$$

l: length of solenoid coil
r: radius of solenoid coil
D: diameter of solenoid coil
N: number of turns Hereinafter, a wireless power transmitter will be described in more detail.

Figure 6:
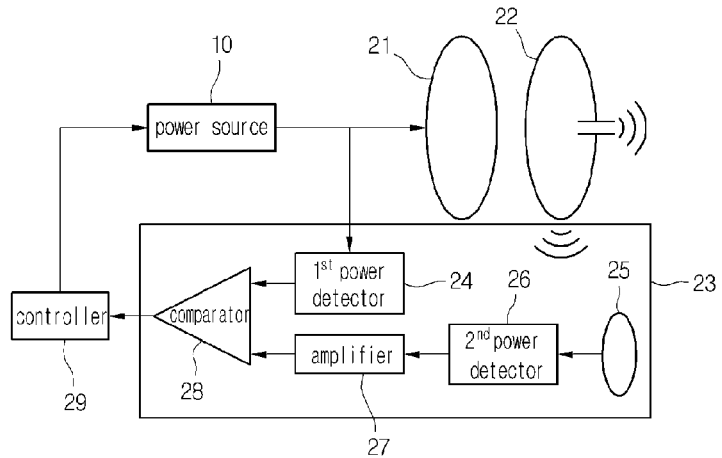
FIG. 6 is a block diagram showing a transmitter according to the embodiment of the disclosure.
Figure 7:
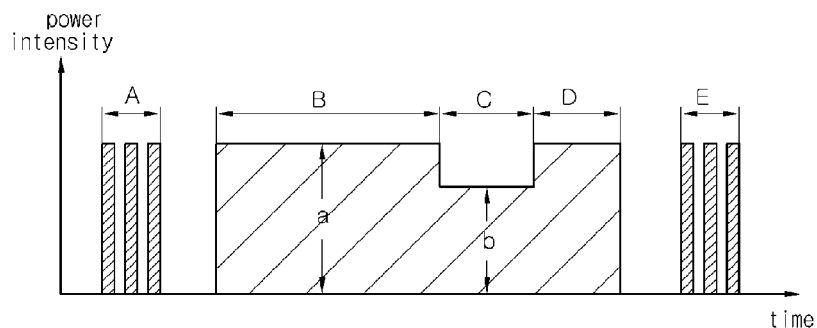
FIG. 7 is a graph showing the transmission state of power according to the embodiment of the disclosure.

FIG. 6 is a view showing a transmitter according to the embodiment of the disclosure, and FIG. 7 is a view showing a power transmission state according to the embodiment of the disclosure.

In this case, FIG. 6 shows the structure having the power source 10 and the transmitter 20 of FIG. 1. In FIG. 6, remaining components except for the power source 10, the transmission coil 21, and the transmission resonance coil 22 may be included in the transmitter 20, or may be included in the power source 10.

Referring to FIG. 6, the transmitter 20 may include the power source 10 to supply transmission power, the transmission coil 21 connected to the power source 10 and generating a magnetic field by the supplied power, the transmission resonance coil 22 coupled with the transmission coil 21 to transmit power, a detector 23 to detect the existence state of the receiver 30, and the controller 29 to control the state of the power supplied through the power source 10 according to the detection result of the detector 23.

According to one embodiment, the detector 23 may detect the state of the power transmitted through the transmission resonance coil 22 and may transmit the detection result of the state of the power to the controller 29.

The detector 23 includes a first power detector 24 to detect the intensity of power output through the power source 10 to convert the power into DC power, a detection coil 25 to detect the intensity of a magnetic field generated from the transmission resonance coil 22, a second power detector 26 to convert the power generated by the magnetic field detected by the detection coil 25 into DC power, and a comparator 28 to compare the output of the first power detector 24 with the output of the second power detector 26 and transmit the comparative result to the controller 29.

In addition, the detector 23 may further include an amplifier 27 to amplify the DC power obtained through the conversion of the second power detector 26.

The detector 23 detects the intensity of the magnetic field generated from the transmission resonance coil 22, and the controller 29 makes a determination that the receiver to receive the magnetic field does not exist if the intensity of the magnetic field detected from the detector 23 is greater than or equal to a preset reference value. In addition, if the intensity of the magnetic field is less than the reference value, the controller 29 makes a determination that the receiver exists.

According to another embodiment, the detector 23 may include a current sensor connected to the front end or the rear end of the power source 10 to measure the intensity of current at the front end or the rear end of the power source 10. According to one embodiment, the current sensor may be placed between the power source 10 and the transmission coil 21. The controller 29 measures the intensity of current output from the power source 10 through a current sensor and makes a determination that the receiver exists if the measured intensity of current is greater than or equal to a threshold current value. In addition, the controller 29 makes a determination that the receiver does not exist if the measured intensity of the current is less than the threshold current value. In this case, the threshold current value may be the minimum value to detect the receiver.

An object of the transmitter according to the disclosure is to automatically prevent power from being transmitted by detecting several cases in which a receiver far away from the transmitter hardly receives power transmitted from the transmitter or the transmitter does not need to generate power because receivers do not exist around the transmitter.

In other words, when a wireless power transmitter is installed in an interior and a wireless power receiver is mounted on a cellular phone or a laptop computer, if the cellular phone or the laptop computer does not exist in the interior, or is located far away from the interior, the transmitter can be automatically prevented from outputting power, or high voltage can be prevented from being applied to the coil of the transmitter by reducing the intensity of the output power. Therefore, the erroneous operation of the transmitter or the breakage of the transmitter, which may occur when the cellular phone or the laptop computer is located in a power transmission possible area thereafter so that the transmitter transmits power to the cellular phone or the laptop computer, can be prevented.

The principle of the transmitter according to the embodiment of the disclosure is as follows. The transmission resonance coil 22 shown in FIG. 6 stores power by using resonance. The quantity of energy stored in the transmission resonance coil 22 is represented as "input voltage*Q (Q=Quality Factor)", and the Q value of the transmission resonance coil 22 is lowered as the power received by the receiver is increased according to the approach to the transmitter.

In addition, since the magnetic force generated from the transmission resonance coil 22 is proportion to energy stored in the transmission resonance coil 22, the quantity of energy stored in the transmission resonance coil 22 is reduced as the receiver approaches the transmitter, so that the intensity of the magnetic field is weakened. Accordingly, the quantity of power detected in the detection coil 25 is reduced.

The detection coil 25 is coupled with the magnetic field generated from the transmission resonance coil 22, and the magnetic field is converted into a DC signal in the second power detector 26. Since the output signal of the second power detector 26 is significantly weak, the output signal may be amplified in the amplifier 27.

Since the output of the first power detector 24 is constant, the output of the first power detector 24 may be used as a reference value. In this case, the comparator 28 outputs a comparative result according to the output signal of the second power detector 26 based on the output signal of the first power detector 24 to the controller 29.

When the receiver is located far away from the transmitter, or does not exist, the energy stored in the transmission resonance coil 22 is increased, so that the intensity of the magnetic field detected by the second power detector 26 is increased.

In this case, the comparative result output through the comparator 28 may be the difference between the output value of the first power detector 24 and the output value of the second power detector 26.

If the receiver exists around the transmitter, the output value of the comparator 28 is zero or a value approximating zero. If the receiver is gradually away from the transmitter, the output value of the comparator 28 is gradually increased. If the receiver does not exist, the output value of the comparator 28 may be equal to the output value of the first power detector 24.

Accordingly, the controller 29 may determine if the receiver exists around the transmitter according to the detection result of the detection part 23.

In addition, if the controller 29 makes a determination that the receiver does not exist, the controller 29 stops the output of the power of the power source 10. In addition, the controller 29 makes a determination that the receiver exits, the controller 29 continuously outputs the power from the power source 10.

Meanwhile, in order to periodically determine the existence state of the receiver (the approaching state of the receiver) in the state that the receiver does not exist, the controller 29 outputs the power from the power source 10 at a predetermined period of time.

In addition, the controller 29 re-determines the existence state of the receiver based on the power output at a predetermined period, and continuously stops the output of the power or resumes the output of the power according to the determination result.

In this case, the controller 29 outputs the power at a predetermined period through a time-division scheme in order to minimize the loss of the power.

In other words, if the power is continuously output at a predetermined period for a specific time, the power loss may occur. Accordingly, the controller 29 outputs time-divided power at a predetermined time interval for the specific time to determine the existence state of the receiver based on the time-divided power.

Meanwhile, the controller 29 periodically checks the detection results of the detector 23, and thus adjusts the intensity of the power based on the detection result.

For example, if the quantity of power supplied from the power source 10 is equal to or make a slight difference from the quantity of the power received in the receiver, the controller 29 increases the intensity of the power output from the power source 10.

In contrast, if the quantity of power supplied from the power source 10 is significantly less than the quantity of the power received in the receiver, the controller 29 decreases the intensity of the power output from the power source 10.

As described above, according to the embodiment of the disclosure, the existence state of the receiver 30 is detected based on the intensity of the magnetic field generated from the transmitter 20, so that the transmitter 20 may continuously transmit power or stop the transmission of the power.

In this case, in order to detect the existence state of the receiver 30 in the state that the receiver 30 does not exist, the magnetic field is generated at a predetermined period through a time-division scheme, thereby minimizing the loss of the power while detecting the existence state of the receiver 30.

In addition, even when the receiver 30 exists, the intensity of the magnetic field is continuously detected, so that only the quantity of power received in the receiver 30 is supplied from the power source 10.

The disclosure is applicable to a power transmission technology based on electromagnetic induction. In this case, a wireless power transmitter may not include a transmission resonance coil, and the detector 23 may detect the existence state of the receiver 30 by using the intensity of the magnetic field generated from the transmission coil 21. In other words, even in the power transmission technology based on the electromagnetic induction, the controller 29 can enhance the power transmission efficiency by adjusting the output of the power source 10 according to the existence state of the receiver 30.

Figure 8:
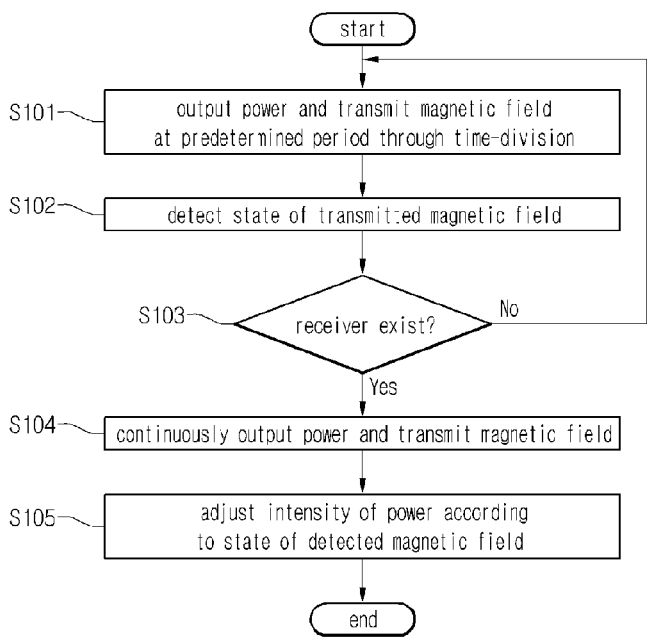
FIG. 8 is a flowchart showing a method of wirelessly transmitting power according to the embodiment of the disclosure.

FIG. 8 is a flowchart showing a method of transmitting power according to the embodiment of the disclosure according to steps.

Hereinafter, the method of transmitting the power will be described with reference to FIGS. 7 and 8.

First, power is supplied at a predetermined period through a time-division scheme in the state that the receiver 30 does not exist (A, step S101).

Then, the intensity of the magnetic field is detected according to the power supplied through the time-division scheme (step S102). In this case, the existence state of the receiver 30 is determined based on the intensity of the magnetic field (step 103)

If a determination is made that the receiver 30 does not exist, step S101 returns. If the determination is made that the receiver 30 exits, the power having a predetermined intensity a is continuously supplied (B, step 104).

In this case, the intensity of the magnetic field is continuously detected even in the state that the receiver 30 exists so that the power is continuously supplied (B).

In addition, the existence state of the receiver 30 is re-determined based on the intensity of the magnetic field.

Further, if the intensity of the magnetic field is increased in the state that the power having a predetermined intensity a is supplied, power greater than the power required by the receiver 30 is supplied through the power source 10. Accordingly, the intensity of the output of the power source 10 is reduced (C, step S105).

In addition, even if the power having the intensity b is supplied, the intensity of the magnetic field is continuously monitored, so that the intensity b may be increased or decreased (D).

Meanwhile, if the intensity of the magnetic field is significantly increased in the state that the power is supplied, a determination is made that the receiver does not exist, so that the output of the power is stopped.

Then, power is supplied at a predetermined period through the time-division scheme, so that the existence state of the receiver is determined (E).

As described above, according to the embodiment of the disclosure, the output of the power is determined according to the existence state of the receiver, and the intensity of the power is adjusted according to the approaching of the receiver, thereby minimizing the loss of power to be meaningless wasted.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmitter which wirelessly transmits power to a wireless power receiver, the wireless power transmitter comprising:
    a power source configured to supply the power to the wireless power transmitter;
    a transmission resonance coil capable of generating a magnetic field and transmitting the power using resonance to the wireless power receiver that has a resonant frequency value equal to that of the wireless power transmitter;
    a detector configured to measure an intensity of the magnetic field; and
    a controller configured to determine an existence state of the wireless power receiver based on the measured intensity of the magnetic field and to control a transmission pattern of the magnetic field according to the determined existence state of the wireless power receiver,
    wherein the controller controls to generate the transmission pattern of the magnetic field that is pulsed at a predetermined time interval for a specific time if the wireless power receiver does not exist and to generate the transmission pattern of the magnetic field that is continuous if the wireless power receiver exists, and
    wherein the controller further controls a power intensity of the magnetic field to vary during the continuous generation of the transmission pattern based on a power requirement of the wireless power receiver.

2. The wireless power transmitter of claim 1, wherein the power source continuously supplies the power if the wireless power receiver exists.

3. The wireless power transmitter of claim 2, wherein the detector measures an intensity of current output from the power source while the power source continuously supplies the power.

4. The wireless power transmitter of claim 3, wherein the controller is further configured to adjust the power according to the intensity of the current output from the power source while the power source continuously supplies the power.

5. The wireless power transmitter of claim 4, wherein the controller is further configured to re-determine the existence state of the wireless power receiver according to the intensity of current output from the power source while the power source continuously supplies the power, and controls the transmission pattern of the magnetic field to be pulsed if the wireless power receiver does not exist.

6. A wireless power transmission method by a wireless power transmitter to wirelessly transmit power to a wireless power receiver, the wireless power transmission method comprising:
   supplying, via a power source, the power to a transmission resonance coil;
   generating a magnetic field, via the transmission resonance coil, for transmitting the power using resonance to the wireless power receiver that has a resonant frequency value equal to that of the wireless power transmitter;
   measuring, at a detector, an intensity of the magnetic field generated by the transmission resonance coil;
   determining, via a controller, an existence state of the wireless power receiver based on the measured intensity of the magnetic field; and
   controlling, via the controller, a transmission pattern of the magnetic field according to the existence state of the wireless power receiver,
   wherein the controller controls to generate the transmission pattern of the magnetic field that is pulsed at a predetermined time interval for a specific time if the wireless power receiver does not exist and to generate the transmission pattern of the magnetic field that is continuous if the wireless power receiver exits, and
   wherein the controller further controls a power intensity of the magnetic field to vary during the continuous generation of the transmission pattern based on a power requirement of the wireless power receiver.

7. The wireless power transmission method of claim 6, wherein the supplying of the power further comprises continuously supplying the power if the wireless power receiver exists.

8. The wireless power transmission method of claim 7, further comprising:
   measuring an intensity of current output from the power source while the power source continuously supplies the power.

9. The wireless power transmission method of claim 8, further comprising:
   adjusting, via the controller, the power according to the intensity of the current output from the power source while the power source continuously supplies the power.

10. The wireless power transmission method of claim 9, further comprising:
    re-determining the existence state of the wireless power receiver according to the intensity of current output from the power source while the power source continuously supplies the power; and
    controlling the transmission pattern of the magnetic field to be pulsed if the wireless power receiver does not exist.

* * * * *